(12) United States Patent
Blachman et al.

(10) Patent No.: US 12,153,655 B2
(45) Date of Patent: Nov. 26, 2024

(54) SYSTEM AND METHOD FOR CLIENT DEVICE AUTHENTICATION THROUGH REMOTE BROWSER ISOLATION

(71) Applicant: Microsoft Technology Licensing, LLC, Redmond, WA (US)

(72) Inventors: Meir Baruch Blachman, Beer Sheva (IL); Guy Lewin, Brooklyn, NY (US); Nir Mardiks Rappaport, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 226 days.

(21) Appl. No.: 17/841,286

(22) Filed: Jun. 15, 2022

(65) Prior Publication Data

US 2023/0409680 A1  Dec. 21, 2023

(51) Int. Cl.
*G06F 21/31* (2013.01)
*G06F 9/451* (2018.01)

(52) U.S. Cl.
CPC ............ *G06F 21/31* (2013.01); *G06F 9/451* (2018.02)

(58) Field of Classification Search
None
See application file for complete search history.

(56) References Cited

U.S. PATENT DOCUMENTS

| 10,552,639 B1* | 2/2020 | Buzbee | G06F 21/6245 |
| 2016/0057228 A1* | 2/2016 | Yasaki | G06F 21/62 |
| | | | 709/213 |

| 2018/0234387 A1* | 8/2018 | Adams | G06F 21/604 |
| 2018/0375877 A1* | 12/2018 | Jakobsson | G06F 16/955 |
| 2019/0075130 A1* | 3/2019 | Petry | H04L 63/0209 |

(Continued)

FOREIGN PATENT DOCUMENTS

EP   2051469 A1   4/2009

OTHER PUBLICATIONS

"Application as Filed in U.S. Appl. No. 17/122,649", Filed Date: Dec. 15, 2020, 44 Pages.

(Continued)

*Primary Examiner* — Kaveh Abrishamkar
(74) *Attorney, Agent, or Firm* — Weaver IP L.L.C.

(57) ABSTRACT

Systems and methods are described for authenticating a client device through remote browser isolation (RBI). An RBI service determines that a remote browser thereof is configured to issue an authentication request to an identity provider to access a resource of a resource provider and, in response, transmits a command to an RBI frontend of a client browser executing on a client computing device. The RBI frontend receives the command and, in response, generates a browsing context that issues a client-side authentication request to the identity provider that includes information accessible to the client computing device. Responsive to issuing the client-side authentication request, the browsing context receives an authentication artifact from an access service and transmits the authentication artifact to the RBI service. The RBI service receives the authentication artifact, generates a response to the authentication request that includes the authentication artifact, and transmits the response to the resource provider.

20 Claims, 6 Drawing Sheets

(56) References Cited

U.S. PATENT DOCUMENTS

| | | | | |
|---|---|---|---|---|
| 2019/0372783 | A1* | 12/2019 | Martinez | H04L 9/321 |
| 2020/0314121 | A1* | 10/2020 | Mittermaier | H04L 63/20 |
| 2021/0194871 | A1* | 6/2021 | Batchu | H04L 63/102 |
| 2021/0250333 | A1* | 8/2021 | Negrea | G06F 9/547 |
| 2021/0336932 | A1* | 10/2021 | Chanak | H04L 9/0894 |
| 2021/0377304 | A1* | 12/2021 | Ma | G06F 40/284 |
| 2022/0004623 | A1* | 1/2022 | Trabelsi | H04L 63/029 |
| 2022/0342981 | A1* | 10/2022 | Wing | G06F 21/606 |

OTHER PUBLICATIONS

"Browser isolation", Retrieved From: https://web.archive.org/web/20220525083130/https://en.wikipedia.org/wiki/Browser_isolation, May 25, 2022, 4 Pages.

"HowTo: intercept mutually-authenticated TLS communications of a Java thick client", Retrieved From: https://offsec.almond.consulting/java-tls-intercept.html, Mar. 31, 2021, 6 Pages.

"Protect teams with Zero Trust Browsing", Retrieved From: https://web.archive.org/web/20220612033122/https://www.cloudflare.com/products/zero-trust/browser-isolation/, Jun. 12, 2022, 7 Pages.

Evans, David, "TLS Interception and SSL Inspection", Retrieved From: https://tlseminar.github.io/tls-interception/, Mar. 20, 2017, 4 Pages.

"What is mutual TLS (mTLS)?", Retrieved From: https://web.archive.org/web/20210616163023/https://www.cloudflare.com/learning/access-management/what-is-mutual-tls/, Jun. 16, 2021, 7 Pages.

"What Is Remote Browser Isolation?", Retrieved From: https://web.archive.org/web/20220603231548/https://www.zscaler.com/resources/security-terms-glossary/what-is-remote-browser-isolation, Jun. 3, 2022, 4 Pages.

Beswick, James, "Introducing mutual TLS authentication for Amazon API Gateway", Retrieved From: https://aws.amazon.com/blogs/compute/introducing-mutual-tls-authentication-for-amazon-api-gateway/, Sep. 17, 2020, 9 Pages.

Curwin, et al., "Deploy Conditional Access App Control for catalog apps with Azure AD", Retrieved From: https://docs.microsoft.com/en-us/defender-cloud-apps/proxy-deployment-aad, Mar. 9, 2022, 9 Pages.

Lin, et al., "Configure TLS mutual authentication for Azure App Service", Retrieved From: https://docs.microsoft.com/en-us/azure/app-service/app-service-web-configure-tls-mutual-auth, Dec. 17, 2021, 17 Pages.

Remington, Darren, "Cloudflare + Remote Browser Isolation", Retrieved From: https://blog.cloudflare.com/cloudflare-and-remote-browser-isolation/, Jan. 7, 2020, 16 Pages.

Rosen, Michael, "Browser Isolation with Microsoft Windows Defender Application Guard (WDAG): What It Does, How It Works and What It Means", Retrieved From: https://threatresearch.ext.hp.com/browser-isolation-with-microsoft-windows-defender-application-guard/, Dec. 11, 2017, 7 Pages.

Upadhyaya, Anupam, "Remote Browser Isolation Enhances SWG Capabilities for Prisma Access", Retrieved From: https://www.paloaltonetworks.com/blog/sase/remote-browser-isolation/, Apr. 5, 2021, 2 Pages.

"International Search Report and Written Opinion Issued in PCT Application No. PCT/US23/022301", Mailed Date: Aug. 9, 2023, 13 Pages.

* cited by examiner

440

By a browsing context, include state information with an authentication request — 442

450

Transmit an authentication artifact to an RBI service via an RBI frontend — 452

460

Identify an RBI service — 462

Transmit an authentication artifact to the identified RBI service — 464

SYSTEM AND METHOD FOR CLIENT DEVICE AUTHENTICATION THROUGH REMOTE BROWSER ISOLATION

BACKGROUND

Remote browser isolation (RBI) systems perform browsing activity in an environment that is isolated from a client computing device. For example, a user of a client computing device may use an RBI service executing on an RBI server to navigate to websites via a remote browser. The remote browser is capable of sending hypertext transfer protocol (HTTP) messages, receiving HTTP messages, rendering hypertext markup language (HTML) code, executing code (e.g., JavaScript® code or cascading style sheet (CSS) code). A processed version of web pages is sent to the client computing device for displaying in a client browser. In this context, the original web content does not reach the client computing device, thereby reducing the risk of malware infiltrating a client computing device from a website.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems and methods are described herein for authenticating a client device through remote browser isolation (RBI). In one aspect, an RBI service executing on an RBI server includes a remote browser that is configured to perform web browsing operations for a client browser executing on a client computing device. The RBI service determines that the remote browser is configured to issue an authentication request to an identity provider to obtain access to a resource of a resource provider. Responsive to the determining, the RBI service transmits a command to an RBI frontend of the client browser. The command comprises an instruction to send a client-side authentication request from the client browser to the identity provider. Responsive to transmitting the command to the RBI frontend of the client browser, the RBI service receives an authentication artifact from the client browser and generates a response to the authentication request that includes the authentication artifact. The RBI service transmits the response to the resource provider.

In another example aspect, a client browser executing on a client computing device is communicatively connected to an RBI service that is executing on an RBI server and that includes a remote browser configured to perform browsing operations for the client browser. The RBI frontend of the client browser receives a command from the RBI service, the command comprising an instruction to issue an authentication request to an identity provider to obtain access to a resource of a resource provider. The RBI frontend generates a browsing context configured to issue the authentication request to the identity provider. The browsing context issues the authentication request to the identity provider. Responsive to issuing the authentication request to the identity provider, the browsing context receives an authentication artifact from an access service. The browsing context transmits the authentication artifact to the RBI service.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
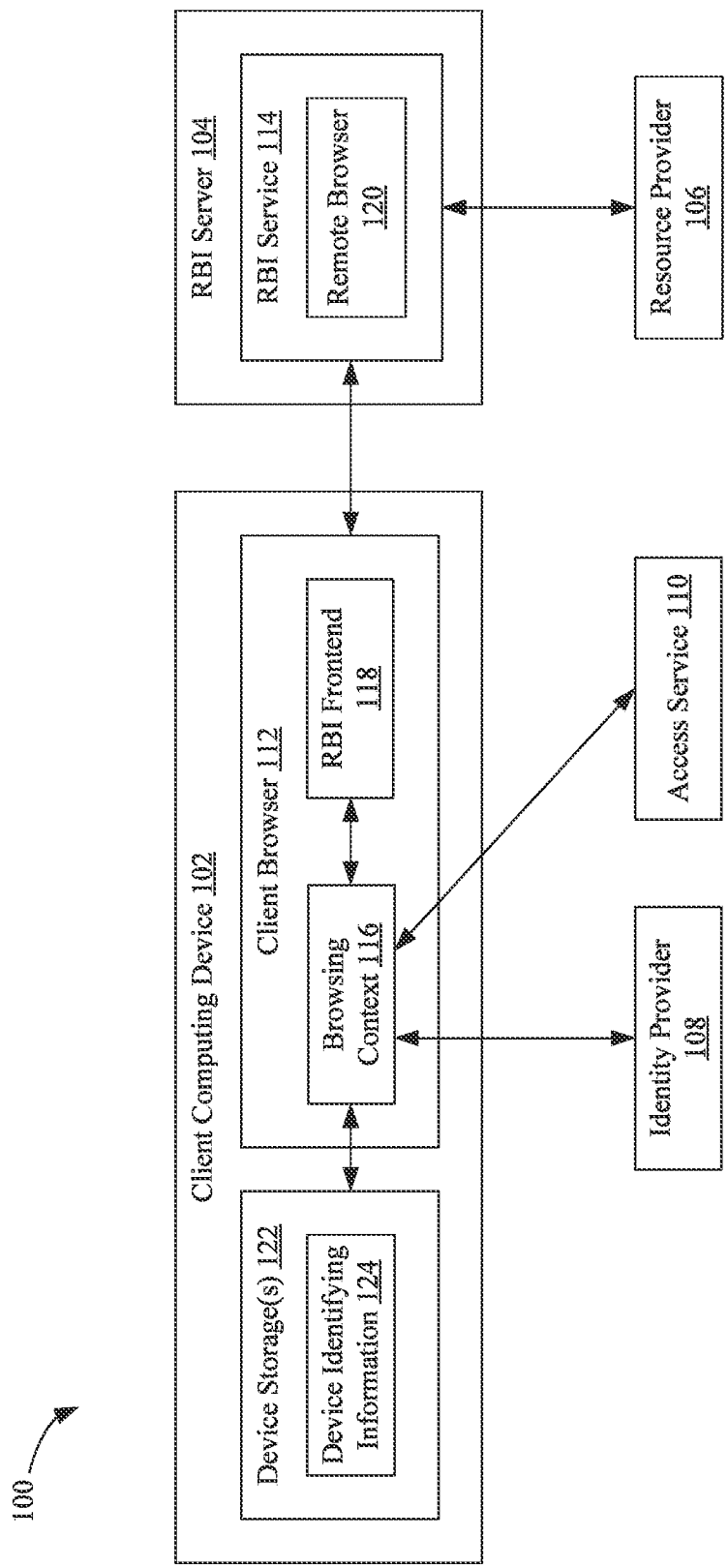
FIG. 1 is a block diagram of an example system that performs client device authentication through remote browser isolation (RBI), in accordance with an embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

Numerous exemplary embodiments are now described. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Systems and Methods for Client-Side Authentication

As discussed in the Background Section above, remote browser isolation (RBI) systems perform browsing activity in an environment isolated from a client computing device. For example, a user of a client computing device may use an RBI service executing on an RBI server to navigate to websites via a remote browser. The remote browser is capable of sending hypertext transfer protocol (HTTP) messages, receiving HTTP messages, rendering hypertext markup language (HTML) code, executing code (e.g., JavaScript® code or cascading style sheet (CSS) code). A processed version of web pages is sent to the client computing device for displaying in a client browser. In this context, the original web content does not reach the client computing device, thereby reducing the risk of malware infiltrating a client computing device from a website.

An RBI service executing a remote browser may communicate with an RBI frontend of a client browser executing on a client computing device to cause processed web pages to be displayed by the client browser. The processed web pages may be sent to the RBI frontend as images (e.g., pixels), graphic rendering instructions (e.g., to render a graphic representation of a web page), rendered HTML (e.g., document object models), and/or any other processed information corresponding to web pages navigated to by the remote browser.

The RBI frontend displays the processed web page in a window of a client browser executing on the client computing device. Furthermore, the RBI frontend transmits information to the RBI service representative of user input received with respect to the window displaying the processed web page. For example, the RBI frontend may transmit letters, numbers, or symbols corresponding to keystrokes provided by a user using a keyboard, x and y coordinates of a mouse click within the window, and/or any other form of input provided with respect to the window displaying the processed web page. The RBI service interprets the information transmitted from the RBI frontend with respect to the remote browser.

RBI services may be implemented in a computing system with a secured access policy. In such computing systems, a principal associated with a client computing device may access a resource of a resource provider through a remote browser of the RBI service if such principal is successfully authenticated. A principal may comprise, for example and without limitation, a user of the client computing device, an application (e.g., a client browser) executing on the client computing device, the client computing device itself, or some combination thereof. A resource may comprise, for example and without limitation, an information object (e.g., a document, a Web page, an image, an audio file, a video file, or an output of an executable), an application, a service, a physical device, and/or any other resource to which access may be provided by a resource provider.

A principal associated with the client computing device may provide user input to an RBI service that causes the remote browser of the RBI service to issue an access request for a resource to a resource provider. The resource provider receives the access request, determines that authentication is required to grant the access request, and sends a redirect message to the remote browser. In response to receiving the redirect message, the remote browser issues an authentication request to an identity provider. Identity providers may be configured to evaluate information included in the authentication request against authentication criteria to determine if the principal associated with the client computing device should be authenticated. Depending on the implementation, the identity provider may evaluate user credentials (e.g., usernames, passwords, or personal identification numbers (PINs)), biometric information (e.g., retina scan, face scan, or fingerprints), device identifying information (e.g., cryptographic keys (e.g., secure socket layer (SSL) client certificates, transport layer security (TLS) client certificates), media access control (MAC) addresses, internet protocol (IP) addresses, or geolocation information), and/or any other information for determining if a principal should be authenticated. Depending on the implementation, some of the evaluated information (e.g., device identifying information) may be accessible to the client computing device but not accessible to the RBI service executing on the RBI server. Consequently, in this scenario, the remote browser will be unable to include such information in the authentication request to the identity provider, and if the identity provider is configured to require such information to authenticate the principal (e.g., as part of performing client device authentication), then the authentication request will fail even if the proper client device is being used.

Embodiments described herein address the foregoing issue by enabling client device authentication through RBI. In particular, systems and methods include an RBI service executing on an RBI server that includes a remote browser that performs web browsing operations for a client browser executing on a client computing device. The RBI service determines that the remote browser is configured to issue an authentication request to an identity provider to obtain access to a resource of a resource provider and, in response to the determining, transmits a command to an RBI frontend of the client browser to issue a client-side authentication request to the identity provider. In response to receiving the command, the RBI frontend generates a browsing context that issues the client-side authentication request to the identify provider. Since the client-side authentication request is generated by the client browser executing on the client computing device, it can include information (e.g., device identifying information) that is required for authentication and is accessible to the client computing device but not to the RBI server. Responsive to issuing the authentication request to the identity provider, the browsing context receives an authentication artifact from an access service that is identified by or is part of the identity provider and transmits the authentication artifact to the RBI service. The RBI service receives the authentication artifact, generates a response to the authentication request that includes the authentication artifact, and transmits the response to the resource provider.

In accordance with this system and method, the client-side authentication request is issued to the identity provider by the client browser rather than by the remote browser. For this reason, the identity provider is able to grant the client-side authentication request because the authentication request can include information necessary for authentication that is accessible to the client computing device but is not accessible to the RBI server. Consequently, this approach represents an improvement over conventional approaches in which the remote browser issues the authentication request to the identity provider but cannot include information necessary for authentication that is accessible to the client computing device but not accessible to the RBI server. Thus, the system and method enable a principal to access resources subject to access policies that require authentication based on information available to the client device but not the RBI server even though RBI is being used.

To help illustrate the aforementioned systems and methods, FIG. 1 will now be described. In particular, FIG. 1 is a block diagram of an example system 100 that performs client device authentication through RBI, in accordance with an embodiment. As shown in FIG. 1, system 100 includes a client computing device 102, an RBI server 104, a resource provider 106, an identity provider 108, and an access service 110. Client computing device 102 is configured to execute a client browser 112 and RBI server 104 is configured to execute an RBI service 114. As further shown in FIG. 1, client browser 112 includes a browsing context 116 and an RBI frontend 118 and RBI service 114 includes a remote browser 120. Generally speaking, system 100 operates to provide a principal associated with client computing device 102 access to a resource of resource provider 106 via remote browser 120 if such principal is successfully authenticated by identity provider 108.

Each component and subcomponent of system 100 may be communicatively connected via one or more networks (not pictured in FIG. 1). These one or more networks may include, for example and without limitation, one or more of a local area network (LAN), a wide area network (WAN), a personal area network (PAN), a private network, a public network, a packet network, a circuit-switched network, a wired network and/or a wireless network.

RBI service 114 is a computer-implemented system that is configured to execute and manage remote browser 120. Remote browser 120 is configured to perform web browsing operations for client browser 112. As shown in FIG. 1, RBI service 114 is implemented on RBI server 104. RBI server may be a single server computing device, or, alternatively, a group of server computing devices. Furthermore, RBI server may be a subset of a networked computing system (e.g., a cloud platform).

Resource provider 106 is intended to represent a device that is operable to communicate with client computing device 102 for the purpose of providing client computing device 102 with access to a resource if a principal associated with client computing device 102 is properly authenticated by identity provider 108. Resource provider 106 may comprise, for example, one or more server computing devices.

Identity provider 108 is a computer-implemented system that is configured to create, maintain, and manage identity information associated with principals (e.g., users, applications, and/or client computing devices) while providing authentication services to relying web services. Identity provider 108 may be implemented, for example, on one or more server computing devices.

Access service 110 is a computer-implemented system that is configured to determine an access policy associated with principals. An access policy may include a client-side access policy, an operating system-based policy, a download access policy, an IP-based access policy, a geolocation-based access policy, a proxy access policy, and/or any other policy used to determine resources that may be accessed by a principal and/or circumstances in which the principal may access those resources. Access service 110 may be implemented, for example, on one or more server computing devices. As shown in FIG. 1, identity provider 108 and access service 110 may be implemented as separate systems; however, it is also contemplated herein that identity provider 108 and access service 110 may be implemented as part of the same system.

Client computing device 102 may be any type of computing device, including a stationary or mobile computing device. Examples of a stationary computing device include but are not limited to a desktop computer, a personal computer (PC), a video game console, or a smart appliance (e.g., a smart television). Examples of a mobile computing device include but are not limited to a smart phone, a laptop computer, a notebook computer, a tablet computer, a netbook, or a wearable computing device (e.g., a smart watch, a head-mounted device including smart glasses such as Google® Glass™, etc.).

As depicted in FIG. 1, client computing device 102 includes one or more device storage(s) 122 ("device storage 122" herein). Device storage 122 may be configured to store device identifying information 124 and/or any other information associated with client computing device 102, client browser 112, and/or system 100. Device identifying information 124 may be any type of information suitable for identifying client computing device 102 (e.g., cryptographic keys (e.g., SSL client certificates, TLS certificates), MAC addresses, IP addresses, or geolocation information), as described herein. Device storage 122 may include any number of hardware-based computer-readable storage media. Alternatively, or additionally, device storage 122 may include a remote storage system (e.g., a cloud storage system or an Intranet storage system) accessible to client computing device 102 via one or more networks.

RBI frontend 118 and RBI service 114 are configured to enable a principal associated with client computing device 102 to access resources of resource provider 106 via remote browser 120. RBI service 114 transmits processed web pages to RBI frontend 118 representative of web pages navigated to by remote browser 120 and receives data representative of user input from RBI frontend 118. Furthermore, RBI service 114 and RBI frontend 118 may communicate via additional communication channels (e.g., an HTTP communication channel or a WebSocket communication channel) for transmitting and/or receiving commands, authentication artifacts, and/or any other information associated with the operation of system 100, as described elsewhere herein.

In view of the foregoing context, an exemplary process by which a principal associated with client computing device 102 may obtain access to a resource provided by resource provider 106 in system 100 will now be described in reference to FIG. 2.

Figure 2:
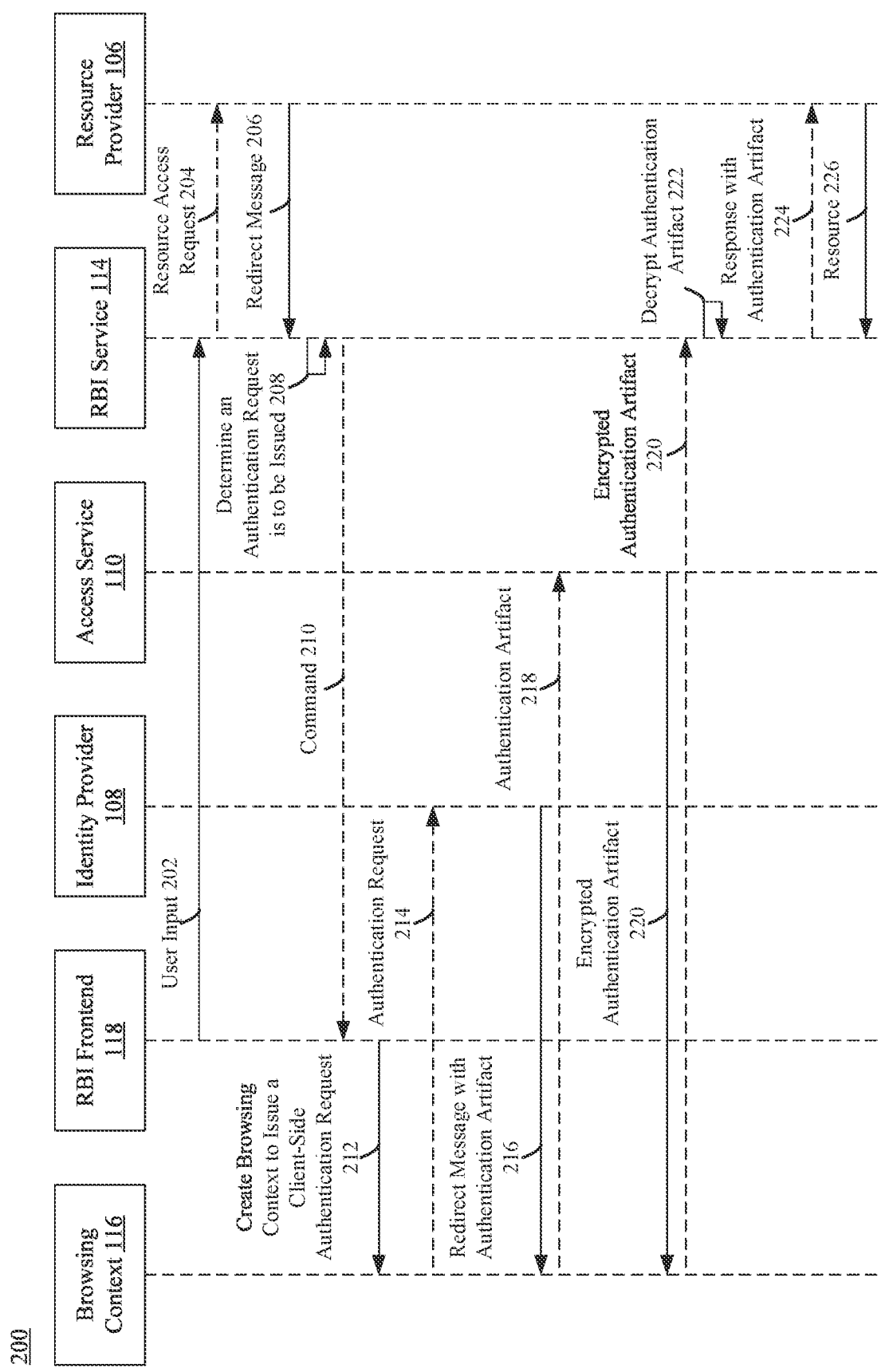
FIG. 2 is a sequence diagram that illustrates a process by which a principal gains access to a resource within the example system of FIG. 1.

As shown in sequence diagram 200 of FIG. 2, the process begins when RBI frontend 118 sends user input 202 to RBI service 114 on behalf of a principal associated with client computing device 102. User input 202 may specify a type of user input (e.g., a key stroke, a mouse click, etc.) and/or any other information indicative of the user input (e.g., x and y coordinates corresponding to a mouse click). Furthermore, while user input 202 is described with respect to a user associated with client computing device 102, user input 202 may correspond to an input of another principal associated with client computing device 102.

RBI service 114 receives user input 202 and interprets user input 202 with respect to remote browser 120. For example, as described in the following example, RBI service 114 determines that user input 202 indicates a request for access to a resource and sends a resource access request 204 to resource provider 106 on behalf of the principal. Resource access request 204 may specify a resource 224 of resource provider 106 for which access is sought.

Resource provider 106 receives resource access request 204 and determines that an authentication artifact is required to grant the request. For example, resource provider 106 may determine that an authentication artifact is required because the principal associated with client computing device 102 has not yet provided one or because an authentication artifact that was previously provided by the principal associated with client computing device 102 has expired. In either case, based on the determination, resource provider 106 sends a redirect message 206 to RBI service 114. Redirect message 206 is configured to redirect remote browser 120 of RBI service 114 to identity provider 108 for the purpose of obtaining an authentication artifact.

In response to receiving redirect message 206, RBI service 114 makes a determination 208 that remote browser 120 is configured to issue an authentication request to identity provider 108. As part of making determination 208, RBI service 114 may determine that the authentication request comprises a device authentication request, determine that the authentication request comprises another authentication that requires information accessible to client computing device 102 and not accessible to RBI server 104, determine that a uniform resource locator (URL) corresponding to identity provider 108 included in redirect message 206 is on a predetermined list of URLs corresponding to identity providers that are configured to perform device authentication, and/or otherwise determine that remote browser 120 is configured to issue an authentication request to identity provider 108. In the context of determining that that a URL corresponding to identity provider 108 is on a predetermined list of URLs, the predetermined list of URLs may be provided by a user associated with client computing device 102, a developer associated with RBI server 104, an administrator associated with an enterprise system including client computing device 102, a user associated with another client computing device of an enterprise system including client computing device 102, and/or any combination thereof. As shown in FIG. 2, based on the determination, RBI service 114 sends a command 210 to RBI frontend 118. Command 210 comprises an instruction to send a client-side authentication request from client browser 112 to identity provider 108. RBI service 114 may send command 210 to RBI frontend 118 via a communication channel that is separate from the communication channels used to send and receive processed web pages and user inputs.

In response to receiving command 210, RBI frontend 118 performs creation step 212. Creation step 212 includes creating browsing context 116 to issue a client-side authentication request. RBI frontend 118 may create browsing context 116 within the same window of client browser 112 that RBI frontend 118 is located in (e.g., as an iframe or frameset), a new tab of client browser 112, or a new window of client browser 112. For example, in accordance with an embodiment, RBI frontend 118 creates browsing context 116 as a child iframe of RBI frontend 118.

Browsing context 116 issues authentication request 214 to identity provider 108 on behalf of the principal. Authentication request 214 may include a credential of the principal. In certain implementations, authentication request 214 may comprise multiple communications. For example, browsing context 116 may initiate authentication request 214 by sending a first communication to identity provider 108. In response to receiving the first communication, identity provider 108 may interact with browsing context 116 to obtain the credential (e.g., user credentials, biometric information, device identifying information, or other type of credential, as described elsewhere herein or otherwise known) as part of a second communication therefrom. For example, identity provider 108 may cause a user interface to be presented by client computing device 102 via which a user may submit the credential to identity provider 108. Alternatively, identity provider 108 may obtain the credential from a cookie that is stored on client computing device 102. For instance, identity provider 108 may obtain a credential indicative of a single-sign on corresponding to the principal from the cookie. In accordance with an embodiment, and as will be discussed further below with respect to FIG. 4B, identity provider 108 may interact with browsing context 116 to obtain device identifying information 124 as part of the second communication therefrom. For instance, identity provider 108 and browsing context 116 may perform an SSL handshake process in which identity provider 108 verifies browsing context 116 has access to an SSL client certificate corresponding to client computing device 102. The SSL client certificate may be stored in device storage(s) 122 (e.g., as all of or a portion of device identifying information 124). However, these are examples only and are not intended to be limiting. Other techniques may be used for communicating the credential from browsing context 116 to identity provider 108.

After receiving authentication request 214, identity provider 108 evaluates certain information included in authentication request 214 against a set of authentication criteria to determine if the principal associated with authentication request 214 should be authenticated. To perform this function, identity provider 108 may access a directory that stores information about principals that can be used by identity provider 108 to determine if the authentication criteria have been met. For example, the directory may store information that can be used by identity provider 108 to verify the credential provided as part of authentication request 214. For the sake of this example, it will be assumed that identity provider 108 determines that the authentication criteria have been met.

In response to determining that the authentication criteria have been met, identity provider 108 generates a redirect message with an authentication artifact 216 ("redirect message 216" herein). The authentication artifact may comprise, for example and without limitation, an access token, an ID token, a refresh token, or a Security Assertions Markup Language (SAML) token. Furthermore, the authentication artifact may include a digital signature generated by identity provider 108.

Browsing context 116 receives redirect message 216 and sends authentication artifact 218 to access service 110. In response to receiving authentication artifact 218, access service 110 determines an access policy corresponding to the principal and/or resource 226, encrypts authentication artifact 218 to generate encrypted authentication artifact 220, and sends encrypted authentication artifact 220 to browsing context 116. Access service 110 may encrypt authentication artifact 218 by applying any suitable encryption algorithm thereto. Access service 110 may encrypt authentication artifact 218 to prevent client computing device 102 from accessing the underlying authentication artifact 218.

Browsing context 116 receives encrypted authentication artifact 220 and transmits it to RBI service 114. Browsing context 116 may transmit authentication artifact 220 to RBI service 114 via a communication channel that is separate from the communication channels used to send and receive processed web pages and user inputs. As will be discussed further below with respect to FIGS. 4E and 4F, browsing context 116 may transmit encrypted authentication artifact 220 directly or indirectly to RBI service 114.

RBI service 114 receives encrypted authentication artifact 220, performs decryption 222 to decrypt encrypted authentication artifact 220 to recover authentication artifact 218, and then transmits authentication artifact 218 as part of a response with authentication artifact 224 ("response 224" herein) to resource provider 106. Decryption 222 may include verifying that encrypted authentication artifact 220 was generated by access service 110. In addition to authentication artifact 218, response 224 may include additional information associated with RBI service 114, resource provider 106, and/or any other component of system 100.

Resource provider 106 receives response 224 and performs a number of checks thereon to determine if the included authentication artifact is sufficient to allow the principal associated with client computing device 102 to access resource 226. For example, resource provider 106 may check a digital signature of the included authentication artifact in order to verify the included authentication artifact was generated by identity provider 108. If this verification of the digital signature fails, then resource provider 106 will not permit the principal associated with client computing device 102 to access resource 226.

If resource provider 106 determines that the included authentication artifact passes the aforementioned checks, then resource provider 106 provides RBI service 114 with access to resource 226 as shown at the bottom of sequence diagram 200.

Figure 3A:
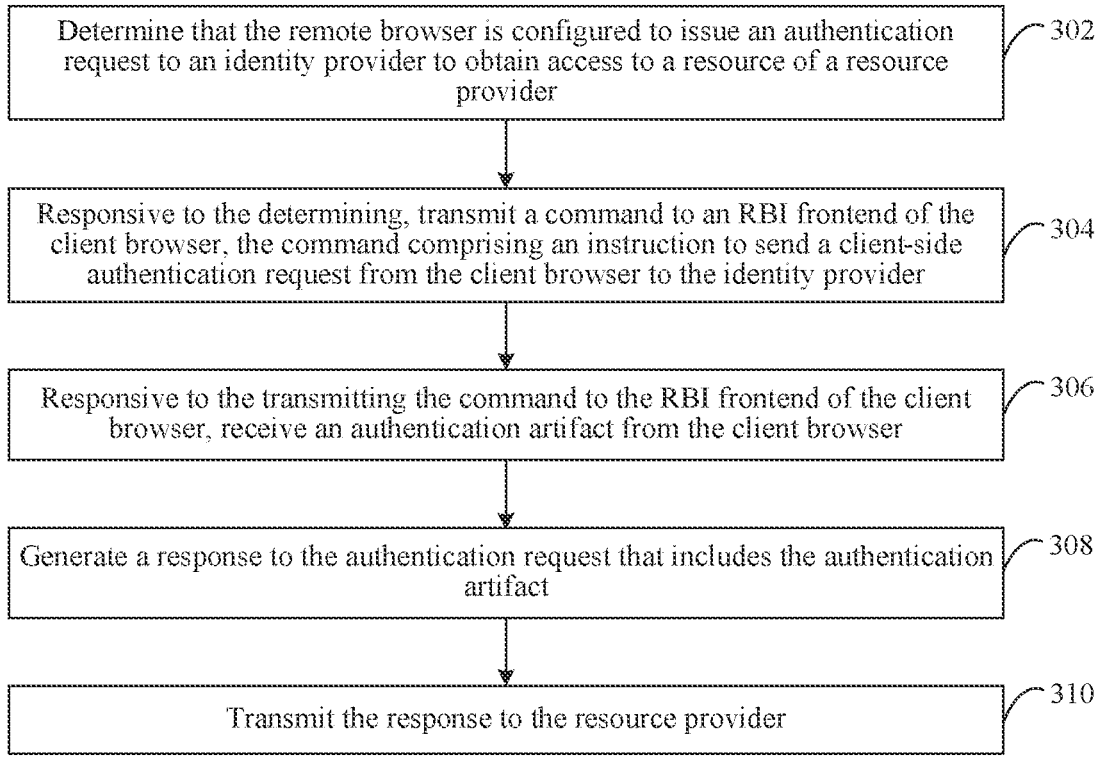
FIG. 3A depicts a flowchart of a process performed by an RBI server for enabling client device authentication through RBI, in accordance with an embodiment.

RBI server 104 may operate in various ways, in embodiments. For instance, FIG. 3A depicts a flowchart 300 of a process performed by an RBI server for enabling client device authentication through RBI, in accordance with an embodiment. RBI server 104 of FIG. 1 may operate according to flowchart 300 in embodiments. Note that not all steps of flowchart 300 need be performed in all embodiments. Further structural and operational embodiments will be apparent to persons skilled in the relevant art(s) based on the following description of FIG. 3A.

Flowchart 300 begins with step 302. In step 302, a determination that the remote browser is configured to issue an authentication request to an identity provider to obtain access to a resource of a resource provider is made. For example, RBI service 114 of FIG. 1 is configured to determine that remote browser 120 is configured to issue an authentication request to identity provider 108 to obtain access to a resource of resource provider 106. For instance, as discussed above in reference to FIG. 2, RBI service 114 may receive a redirect message 206 from resource provider 106, which is configured to redirect remote browser 120 to identity provider 108.

Furthermore, RBI service 114 in accordance with an embodiment may have additional criteria for performing step 302. For instance, RBI service 114 of FIG. 1 may determine redirect message 206 is configured to redirect remote browser 120 to an identity provider that is configured to perform device authentication based on information that is accessible to client computing device 102 and not accessible to RBI server 104. For example, as discussed above in reference to FIG. 2, RBI service 114 may make this determination based at least on a URL corresponding to identity provider 108 included in redirect message 206.

In step 304, responsive to the determining, a command is transmitted to an RBI frontend of the client browser. The command includes an instruction to send a client-side authentication request from the client browser to the identity provider. For example, as discussed in reference to FIG. 2, RBI service 114 transmits command 210 to RBI frontend 118 of client browser 112. Command 210 includes an instruction to send authentication request 214 from client browser 112 to identity provider 108.

In step 306, responsive to the transmitting the command to the RBI frontend of the client browser, an authentication artifact is received from the client browser. For example, RBI service 114 of FIG. 1 is configured to receive an authentication artifact from client browser 112. Depending on the implementation, RBI service 114 may receive the authentication artifact as part of a response that includes additional data associated with the authentication request, command 210, the authentication artifact, client computing device 102, and/or RBI server 104. As discussed above in reference to FIG. 2, and as will further be discussed below with respect to FIG. 3B, the authentication artifact received from client browser 112 may be an encrypted authentication artifact (e.g., encrypted authentication artifact 220).

In step 308, a response to the authentication request that includes the authentication artifact is generated. For example, RBI service 114 of FIG. 1 is configured to generate a response to the authentication request that includes the authentication artifact received in step 306. Generating the response may include processing information included with the authentication artifact received in step 306, decrypting the authentication artifact (e.g., as will be discussed further below with respect to FIG. 3B), and/or otherwise analyzing, including, evaluation, and/or processing information to generate a response to the authentication request corresponding to the determination in step 302.

In step 310, the response is transmitted to the resource provider. For example, RBI service 114 of FIG. 1 is configured to transmit the response generated in step 308 to resource provider 106. As discussed above in reference to FIG. 2, the response (e.g., response 224) may include the authentication artifact received in step 306.

Figure 3B:
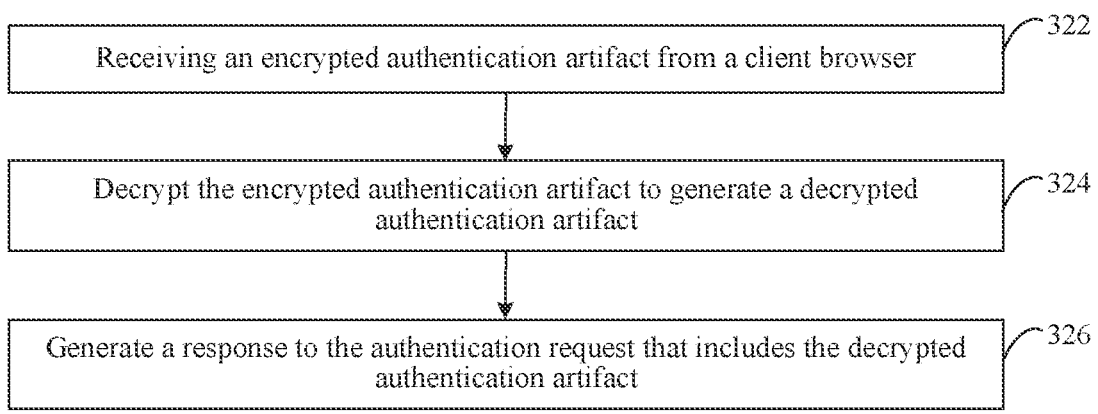
FIG. 3B depicts a flowchart of a process performed by an RBI server for generating a response to an authentication request, in accordance with an embodiment.

RBI service 114 may generate a response to an authentication request in various ways, in embodiments. For instance, FIG. 3B depicts a flowchart 320 of a process performed by an RBI server for generating a response to an authentication request, in accordance with an embodiment. Flowchart 320 may be a further embodiment of steps 304 and 308 of FIG. 3A. RBI server 104 of FIG. 1 may operate according to flowchart 320 in embodiments. Note that not all steps of flowchart 320 need be performed in all embodiments. Further structural and operational embodiments will be apparent to persons skilled in the relevant art(s) based on the following description of FIG. 3B.

Flowchart 320 begins with step 322. In step 322, an encrypted authentication artifact is received from a client browser. For example, as discussed above in reference to FIG. 2, RBI service 114 receives encrypted authentication artifact 220 from browsing context 116 of client browser 112.

In step 324, the encrypted authentication artifact is decrypted to generate a decrypted authentication artifact. For example, as discussed above in reference to FIG. 2, RBI service 114 performs decryption 222 to decrypt encrypted authentication artifact 220 and generate a decrypted authentication artifact.

In step 326, a response to an authentication request is generated that includes the decrypted authentication artifact. For example, RBI service 114 is configured to generate a response to the authentication request that includes the authentication artifact decrypted in step 324.

Figure 4A:
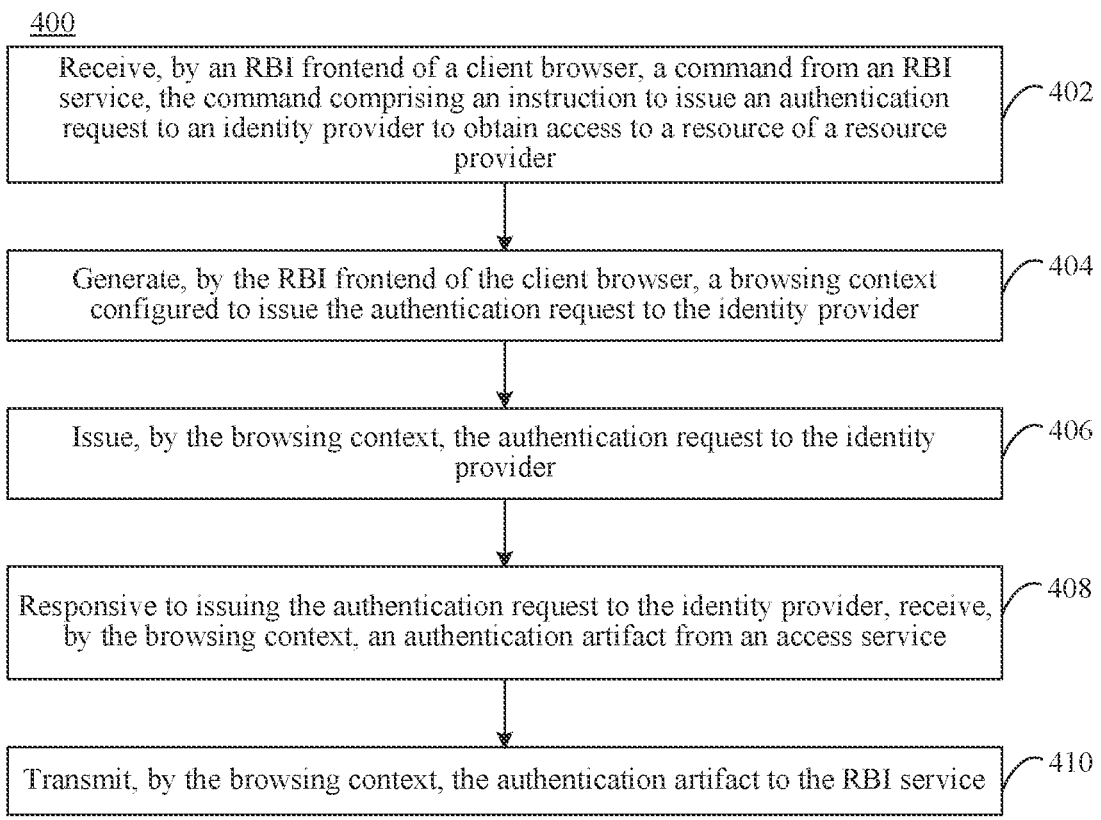
FIG. 4A depicts a flowchart of a process performed by a client browser for enabling client device authentication through RBI, in accordance with an embodiment.

Client browser 112 executing on client computing device 102 may operate in various ways, in embodiments. For example, FIG. 4A depicts a flowchart 400 of a process performed by a client browser for enabling client device authentication through RBI, in accordance with an embodiment. Client browser 112 of FIG. 1 may operate according to flowchart 400 in embodiments. Note that not all steps of flowchart 400 need be performed in all embodiments. Further structural and operational embodiments will be apparent to persons skilled in the relevant art(s) based on the following description of FIG. 4A.

Flowchart 400 begins with step 402. In step 402, an RBI frontend of a client browser receives a command from an RBI service. The command includes an instruction to issue an authentication request to an identity provider to obtain access to a resource of a resource provider. For example, as discussed above in reference to FIG. 2, RBI frontend 118 receives command 210 from RBI service 114. Command 210 includes an instruction to issue an authentication request to identity provider 108 to obtain access to a resource of resource provider 106. Command 210 may include any other information associated with RBI server 104, client computing device 102, resource provider 106, identity provider 108, and/or any other component of system 100.

In step 404, the RBI frontend of the client browser generates a browsing context configured to issue the authentication request to the identity provider. For example, as discussed above in reference to FIG. 2, RBI frontend 118 generates browsing context 118 to issue the authentication request to identity provider 108. RBI frontend 118 may generate browsing context 116 as an iframe or frameset within the same window of client browser 112 as RBI frontend 118, another tab (e.g., a new tab) of client browser 112, or another window (e.g., a new window) of client browser 112, as described herein.

In step 406, the browsing context issues the authentication request to the identity provider. For example, as discussed above in reference to FIG. 2, browsing context 116 issues authentication request 214 to identity provider 108. As described elsewhere herein, authentication request 214 may include multiple communications.

In step 408, responsive to issuing the authentication request to the identity provider, the browsing context receives an authentication artifact from an access service. For example, as discussed above in reference to FIG. 2, browsing context 116 receives encrypted authentication artifact 220 from access service 110. As shown in FIG. 1 and described with respect to FIG. 2, identity provider 108 and access service 110 may be separate services executed by separate systems. Alternatively, access service 110 is incorporated within the same system executing identity provider 108, or as a subservice of identity provider 108. Furthermore, as described with respect to FIG. 2 above, the authentication artifact received by browsing context 116 from access service 110 may be encrypted.

In step 410, the browsing context transmits the authentication artifact to the RBI service. For example, as described above in reference to FIG. 2, browsing context 116 transmits encrypted authentication artifact 220 to RBI service 114. Depending on the implementation the transmission may include other information in addition to encrypted authentication artifact 220, as described elsewhere herein.

Figure 4B:
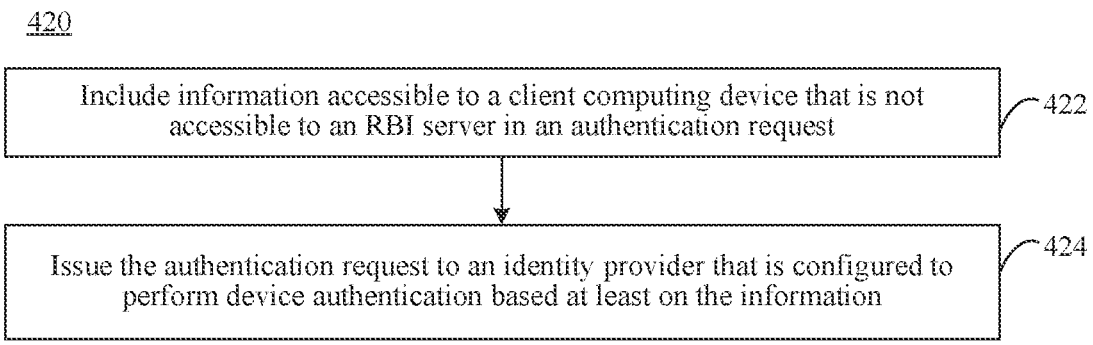
FIG. 4B depicts a flowchart of a process performed by a browsing context of a client browser for issuing a client-side authentication request to an identity provider, in accordance with an embodiment.

Browsing context 116 may issue a client-side authentication request in various ways, in embodiments. FIG. 4B depicts a flowchart 420 of a process performed by a browsing context of a client browser for issuing a client-side authentication request to an identity provider, in accordance with an embodiment. Flowchart 420 may be a further embodiment of step 406 of FIG. 4A. Browsing context 116 of FIG. 1 may operate according to flowchart 420 in embodiments. Note that not all steps of flowchart 420 need be performed in all embodiments. Further structural and operational embodiments will be apparent to persons skilled in the relevant art(s) based on the following description of FIG. 4B.

Flowchart 420 begins with step 422. In step 422, information accessible to a client computing device that is not accessible to an RBI server is included in an authentication request. For example, browsing context 116 of FIG. 1 may be configured to include device identifying information 124 in an authentication request (e.g., authentication request 214) issued to identity provider 108. As discussed above with respect to FIG. 2, authentication request 214 may include multiple communications. For instance, in a running example browsing context 116 initiates authentication request 214 by sending a first communication to identity provider 108. In response to receiving the first communication, identity provider 108 interacts with browsing context 116 to obtain device identifying information 124. For example, identity provider 108 may determine device identifying information 124 is required to grant authentication request 214 and issue a request to browsing context 116 to provide device identifying information 124.

In step 424, the authentication request is issued to an identity provider that is configured to perform device authentication based at least on the information. For example, browsing context 116 of FIG. 1 may be configured to issue the authentication request of step 422 to identity provider 108, identity provider 108 being configured to perform device authentication based at least on device identifying information 124. For instance, with respect to the running example discussed above with respect to step 422, in response to identity provider 108 interacting with browsing context 116 to obtain device identifying information 124, browsing context 116 issues the authentication request including device identifying information 124.

In embodiments, client device authentication through RBI is performed by client computing device 102, identity provider 108, and access service 110 with respect to RBI service 114 executing on RBI server 104. The client device authentication may be performed based on state information that identifies RBI service 114. Depending on the implementation, the state information may be included in the command sent from RBI server 104 (e.g., command 210), determined by RBI frontend 118, included in an authentication request issued by browsing context 116 (e.g., authentication request 214), determined by access service 110 (e.g., as part of generating encrypted authentication artifact 220), and/or otherwise utilized by one or more components or subcomponents of system 100 to identify RBI service 114. Several example processes regarding state information to identify RBI service 114 are described below.

Figure 4C:
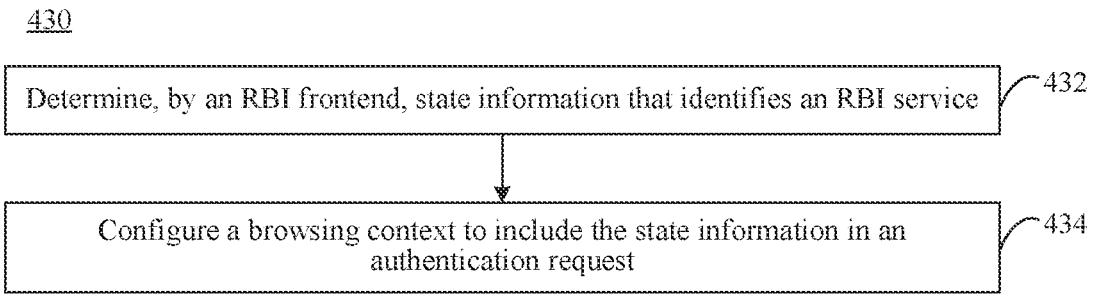
FIG. 4C depicts a flowchart of a process performed by an RBI frontend of a client browser for generating a browsing context configured to issue an authentication request to an identity provider, in accordance with an embodiment.

As stated above, RBI frontend 118 may be configured to determine state information that identifies RBI service 114. For instance, FIG. 4C depicts a flowchart 430 of a process performed by an RBI frontend of a client browser for generating a browsing context configured to issue an authentication request to an identity provider by the browsing context, in accordance with an embodiment. Flowchart 430 may be a further embodiment of step 404 of FIG. 4A. RBI frontend 118 of FIG. 1 may operate according to flowchart 430 in embodiments. Note that not all steps of flowchart 430 need be performed in all embodiments. Further structural and operational embodiments will be apparent to persons skilled in the relevant art(s) based on the following description of FIG. 4C.

Flowchart 430 begins with step 432. In step 432, an RBI frontend determines state information that identifies an RBI service. For example, RBI frontend 118 of FIG. 1 may be configured to determine state information that identifies RBI service 114. For instance, RBI frontend 118 may determine that command 210 received from RBI service 114 includes the state information. Alternatively, RBI frontend 118 may generate the state information in response to receiving command 210. The state information may include an endpoint of RBI service 114, an IP address of a server computing device of RBI server 104, and/or any other information suitable for identifying RBI service 114.

In step 434, a browsing context is configured to include the state information in an authentication request. For example, browsing context 116 of FIG. 1 may be configured to include the state information determined in step 432 in an authentication request issued to identity provider 108 (e.g., authentication request 214 as described with respect to FIG. 2). For instance, browsing context 116 may include the state information determined in step 432 in a URL used to interact with identity provider 108 and/or access service 110.

Figures 4D, 4E, 4F:
FIG. 4D depicts a flowchart of a process performed by a browsing context of a client browser for issuing a client-side authentication request to an identity provider, in accordance with an embodiment.
FIG. 4E depicts a flowchart of a process performed by a browsing context of a client browser for transmitting an authentication artifact to an RBI service, in accordance with an embodiment.
FIG. 4F depicts a flowchart of a process performed by a browsing context of a client browser for transmitting an authentication artifact to an RBI service, in accordance with an embodiment.

As stated above, browsing context 116 may include state information in an authentication request issued to identity provider 108. Depending on the implementation, browsing context 116 may include state information in an authentication request without RBI frontend 118 determining the state information. For instance, FIG. 4D depicts a flowchart 440 of a process performed by a browsing context of a client browser for issuing a client-side authentication request to an identity provider, in accordance with an embodiment. Flowchart 440 may be a further embodiment of step 406 of FIG. 4A. Browsing context 116 of FIG. 1 may operate according to flowchart 440 in embodiments. Note that the step of flowchart 440 need not be performed in all embodiments. Further structural and operational embodiments will be apparent to persons skilled in the relevant art(s) based on the following description of FIG. 4D.

Flowchart 440 includes step 442. In step 442, a browsing context includes state information with an authentication request to an identity provider. For example, browsing context 116 of FIG. 1 may include state information with an authentication request 214 issued to identity provider 108. In this context, state information may be included in command 210 received from RBI service 114, determined by RBI frontend 118 as described above with respect to flowchart 430 of FIG. 4C, and/or otherwise provided to or determined by browsing context 116 to include with an authentication request issued to identity provider 108. For instance, browsing context 116 may include the state information determined in a URL used to interact with identity provider 108 and/or access service 110.

Thus, several example embodiments have been described with respect to FIGS. 4C and 4D for including state information for identifying RBI service 114 in authentication requests issued to identity provider 108. However, it is contemplated herein that state information may be determined in other ways. For instance, identity provider 108 may determine state information as part of authentication processes described herein. Furthermore, access service 110 may determine state information as part of generating an (e.g., encrypted) authentication token. For example, access service 110 may interact with browsing context 116 (e.g., as part of determining an access policy corresponding to a principal associated with an authentication request) in order to determine state information and identify RBI service 114. For instance, in an embodiment where browsing context 116 is generated in the same window of client browser 112 as RBI frontend 118, access service 110 is able to identify RBI service 114 through RBI frontend 118 via interacting with browsing context 116. Still, state information may be determined and/or RBI service 114 may be identified in other ways, as would be understood by a person skilled in the relevant art(s) having benefit of the present disclosure.

Browsing context 116 may be configured to transmit the authentication artifact to RBI service 114 in various ways, in embodiments. For instance, browsing context 116 may be configured to transmit the authentication artifact to RBI service 114 indirectly (e.g., via another component of client browser 112 or client computing device 102) or directly (e.g., via browsing context 116). For example, FIG. 4E depicts a flowchart 450 of a process performed by a browsing context of a client browser for transmitting an authentication artifact to an RBI service, in accordance with an embodiment. Flowchart 450 may be a further embodiment of step 410 of FIG. 4A. Browsing context 116 of FIG. 1 may operate according to flowchart 450 in embodiments. Note that the step of flowchart 450 need not be performed in all embodiments. Further structural and operational embodiments will be apparent to persons skilled in the relevant art(s) based on the following description of FIG. 4E.

Flowchart 450 includes step 452. In step 452, an authentication artifact is transmitted to an RBI service via an RBI frontend. For example, browsing context 116 may transmit encrypted authentication artifact 220 to RBI service 114 via RBI frontend 118. For instance, in accordance with an embodiment, browsing context 116 is generated (e.g., as an iframe or frameset) in the same window of client browser 112 as a child frame of RBI frontend 118. In this context, browsing context 116 is able to operate within the scope of RBI frontend 118. For example, browsing context 116 interacts with (e.g., receives commands from and/or transmits authentication artifacts to) RBI service 114 via RBI frontend 118. In this context, browsing context 116 and RBI frontend 118 may communicate using frame-to-frame communication techniques.

Alternative to the example embodiment described above with respect to FIG. 4E, browsing context 116 may transmit an authentication artifact (e.g., directly) to RBI service 114 (e.g., without RBI frontend 118). For example, FIG. 4F depicts a flowchart 460 of a process performed by a browsing context of a client browser for transmitting an authentication artifact to an RBI service, in accordance with another embodiment. Flowchart 460 may be a further embodiment of step 410 of FIG. 4A. Browsing context 116 of FIG. 1 may operate according to flowchart 460 in embodiments. Note that not all steps of flowchart 460 need be performed in all embodiments. Further structural and operational embodiments will be apparent to persons skilled in the relevant art(s) based on the following description of FIG. 4F.

Flowchart 460 begins with step 462. In step 462, an RBI service is identified. For example, browsing context 116 may be configured to identify RBI service 114. RBI service 114 may be identified using state information, as described elsewhere herein. For instance, access service 110 may request state information identifying RBI service 114 from browsing context 116. Alternatively, browsing context 116 may present state information to access service 110 in response to receiving redirect message 216 from identity provider 108. In yet another alternative, browsing context 116 identifies RBI service 114 without providing state information to access service 110.

In step 464, an authentication artifact is transmitted to the identified RBI service. For example, browsing context 116 may be configured transmit the authentication artifact to RBI service 114, as identified in step 462. In this context, browsing context 116 may transmit an authentication artifact (e.g., encrypted authentication artifact 220) to RBI service 114 while being in a different window of client browser 112 than RBI frontend 118, a different tab of client browser 112 than RBI frontend 118, or otherwise operating in a different scope than RBI frontend 118.

III. Further Example Embodiments and Advantages

As noted above, systems and devices may be configured in various ways for enabling client device authentication through RBI. Example embodiments have been described with respect to remote browsers and RBI services, which may be implemented in various ways. For example, an RBI service in accordance with an embodiment may be implemented in a cloud access security broker (CASB) proxy server. In this example, the RBI service is executing on a proxy server (e.g., a proxy computing device) interconnected between a client computing device and a server computing device (e.g., a web server or other resource providing server). In another example, an RBI service may be implemented as part of a firewall or antivirus system. For instance, a client browser may be directed to an RBI frontend in response to a firewall determining a destination web page is potentially malicious. In this context, the remote browser of the RBI service is configured to navigate to the destination web page on behalf of the client browser. Still, other RBI applications may implement one or more of the systems or methods described herein.

Furthermore, embodiments have been described herein with respect to client device authentication. However, it is also contemplated herein that an RBI service may be configured to transmit commands to a client browser to issue other types of authentication as well. For instance, an RBI service may transmit a command to a client browser to issue some or all authentication requests to an identity provider. Alternatively, an RBI service may be configured to issue (e.g., a subset of) authentication requests to an identity provider. For example, an RBI service may determine an RBI server-side authentication request may be suitable for responding to a redirect message received from a resource provider. For instance, an RBI service in accordance with an embodiment may determine the authentication of a principal does not require authentication based on information available to the client device but not the RBI server. In this context, the RBI service issues the RBI server-side authentication request to the identity provider, receives the authentication token, and provides the authentication token to the resource provider.

Systems and methods have been described herein with respect to browsing contexts configured to issue authentication requests to identity provider. As described herein, a browsing context may be implemented in an iframe, a frameset, a tab, or a window of a client browser. For instance, in an iframe implementation, the browsing context is generated as an iframe that is hidden or otherwise rendered within a window of a client browser in a manner intended to reduce visibility or not obscure a user's view of processed web pages displayed by an RBI frontend. For example, a browsing context in one particular implementation is generated as an iframe the size of a single pixel. Alternatively, a browsing context may be implemented as an iframe, a frameset, a tab, or a window of a client browser that displays information to and/or requests input from a user associated with the client browser. For example, the browsing context may be implemented as a pop-up window that indicates progress of authenticating the user and/or requests the user to provide user input (e.g., user credentials).

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

IV. Example Computer System Implementation

Figure 5:
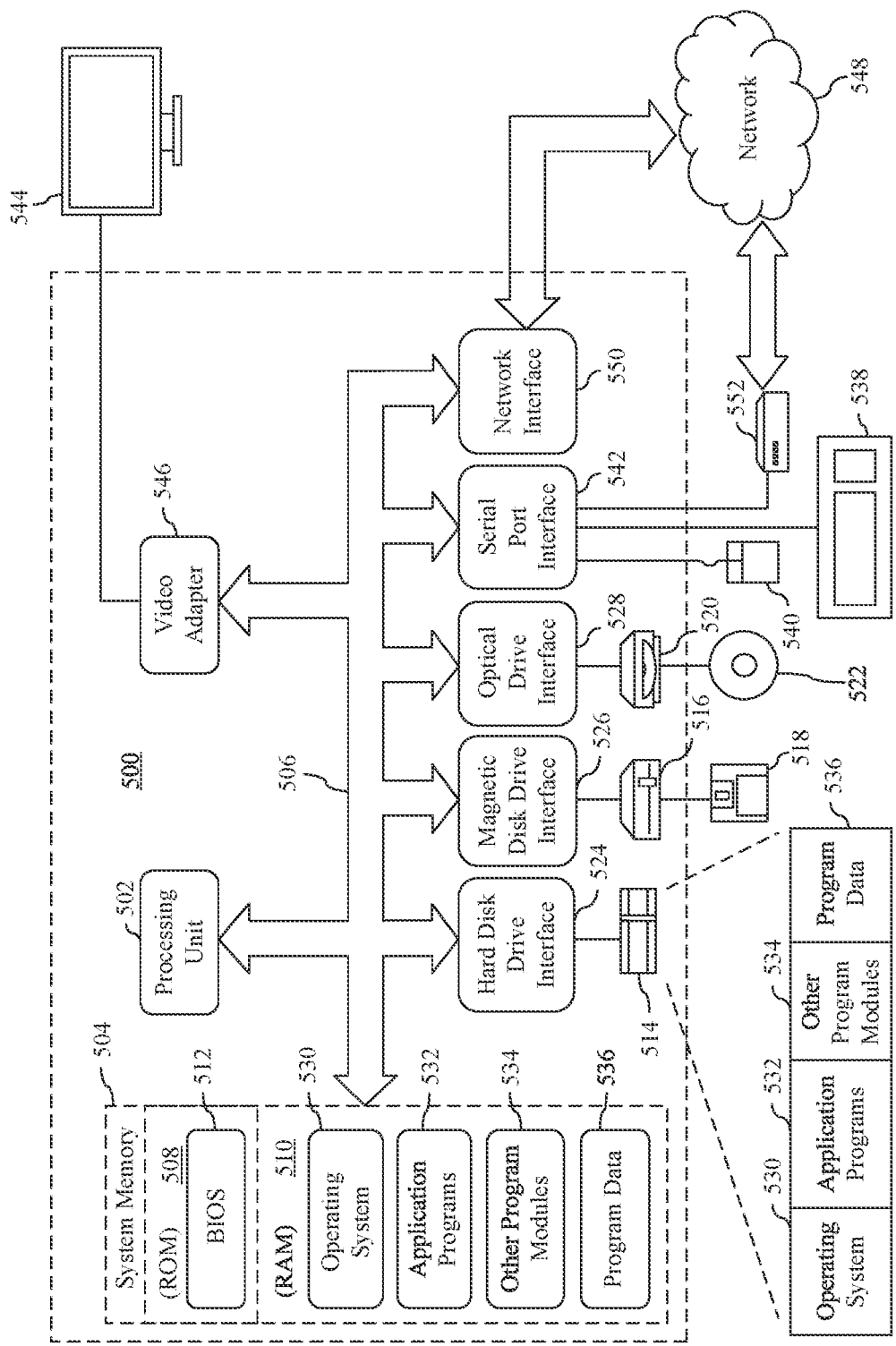
FIG. 5 is a block diagram of an example computing device that may be used to implement embodiments.

FIG. 5 depicts an example processor-based computer system 500 ("system 500" herein) that may be used to implement various embodiments described herein, such as any of the embodiments described in the Sections above and in reference to FIGS. 1-4F. For example, system 500 may be used to implement any of the components of system 100 as described above in reference to FIG. 1, any of the operations of sequence diagram 200 as described above in reference to FIG. 2, and/or any of the flowcharts described above in reference to FIGS. 3A-4F. The description of system 500 provided herein is provided for purposes of illustration and is not intended to be limiting. Embodiments may be implemented in further types of computer systems, as would be known to persons skilled in the relevant art(s).

As shown in FIG. 5, system 500 includes one or more processors, referred to as processing unit 502, a system memory 504, and a bus 506 that couples various system components including system memory 504 to processing unit 502. Processing unit 502 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processing unit 502 may execute program code stored in a computer readable medium, such as program code of operating system 530, application programs 532, other program modules 534, etc. Bus 506 represents one or more of any of several types of bus structures, including a memory bus or memory controller, a peripheral bus, an accelerated graphics port, and a processor or local bus using any of a variety of bus architectures. System memory 504 includes read only memory (ROM) 508 and random access memory (RAM) 510. A basic input/output system 512 (BIOS) is stored in ROM 508.

System 500 also has one or more of the following drives: a hard disk drive 514 for reading from and writing to a hard disk, a magnetic disk drive 516 for reading from or writing to a removable magnetic disk 518, and an optical disk drive 520 for reading from or writing to a removable optical disk 522 such as a CD ROM, DVD ROM, or other optical media. Hard disk drive 514, magnetic disk drive 516, and optical disk drive 520 are connected to bus 506 by a hard disk drive interface 524, a magnetic disk drive interface 526, and an optical drive interface 528, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 530, one or more application programs 532, other program modules 534, and program data 536. Application programs 532 or other program modules 534 may include, for example, computer program logic (e.g., computer program code or instructions) for implementing the systems described above, including the embodiments described in reference to FIGS. 1-4F.

A user may enter commands and information into the system 500 through input devices such as keyboard 538 and pointing device 540. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processing unit 502 through a serial port interface 542 that is coupled to bus 506, but may be connected by other interfaces, such as a parallel port, game port, or a universal serial bus (USB).

A display screen 544 is also connected to bus 506 via an interface, such as a video adapter 546. Display screen 544 may be external to, or incorporated in, system 500. Display screen 544 may display information, as well as being a user interface for receiving user commands and/or other information (e.g., by touch, finger gestures, virtual keyboard, etc.). In addition to display screen 544, system 500 may include other peripheral output devices (not shown) such as speakers and printers.

System 500 is connected to a network 548 (e.g., the Internet) through an adaptor or network interface 550, a modem 552, or other means for establishing communications over the network. Modem 552, which may be internal or external, may be connected to bus 506 via serial port interface 542, as shown in FIG. 5, or may be connected to bus 506 using another interface type, including a parallel interface.

As used herein, the terms "computer program medium," "computer-readable medium," and "computer-readable storage medium" are used to generally refer to physical hardware media such as the hard disk associated with hard disk drive 514, removable magnetic disk 518, removable optical disk 522, other physical hardware media such as RAMs, ROMs, flash memory cards, digital video disks, zip disks, MEMs, nanotechnology-based storage devices, and further types of physical/tangible hardware storage media (including system memory 504 of FIG. 5). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 532 and other program modules 534) may be stored on the hard disk, magnetic disk, optical disk, ROM, RAM, or other hardware storage medium. Such computer programs may also be received via network interface 550, serial port interface 552, or any other interface type. Such computer programs, when executed or loaded by an application, enable system 500 to implement features of embodiments discussed herein. Accordingly, such computer programs represent controllers of the system 500.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Additional Exemplary Embodiments

In an embodiment a system includes a client computing device executing a client browser. The client browser is communicatively connected to a remote browser isolation (RBI) service that is executing on an RBI server. The RBI service includes a remote browser configured to perform browsing operations for the client browser. The client browser includes an RBI frontend. The RBI frontend is configured to receive a command from the RBI service. The command includes an instruction to issue an authentication request to an identity provider to obtain access to a resource of a resource provider. The RBI frontend is further configured to generate a browsing context in response to receiving the command. The browsing context is configured to issue the authentication request to the identity provider. In response to issuing the authentication request to the identity provider, the browsing context is configured to receive an authentication artifact from an access service. The browsing context is further configured to transmit the authentication artifact to the RBI service.

In an embodiment, the browsing context is one of an iframe of the client browser, a frameset of the client browser, a tab of the client browser, or a window of the client browser.

In an embodiment, the authentication request includes information accessible to the client computing device that is not accessible to the RBI server. The identity provider includes an identity provider that is configured to perform device authentication based at least on the information.

In an embodiment, the information includes a secure sockets layer (SSL) client certificate.

In an embodiment, the access service includes an access service that is configured to determine an access policy corresponding to the client computing device and generate the authentication artifact based at least on the determined access policy.

In an embodiment, the browsing context is configured to transmit the authentication artifact to the RBI service by transmitting the authentication artifact to the RBI service via the RBI frontend.

In an embodiment, the browsing context is configured to transmit the authentication artifact to the RBI service by identifying the RBI service and transmitting the authentication artifact to the identified RBI service.

In an embodiment, a method is performed by a client browser that is executing on a client computing device. The client browser is communicatively connected to a remote browser isolation (RBI) service that is executing on an RBI server. The RBI service includes a remote browser configured to perform browsing operations for the client browser. The method includes, by an RBI frontend of the client browser, receiving a command from the RBI service. The command includes an instruction to issue an authentication request to an identity provider to obtain access to a resource of a resource provider. A browsing context configured to issue the authentication request to the identity provider is generated by the RBI frontend. The authentication request is issued to the identity provider by the browsing context. Responsive to issuing the authentication request to the identity provider, the browsing context receives an authentication artifact from an access service. The browsing context transmits the authentication artifact to the RBI service.

In an embodiment, the browsing context is one of an iframe of the client browser, a frameset of the client browser, a tab of the client browser, or a window of the client browser.

In an embodiment, issuing the authentication request to the identity provider includes: including information accessible to the client computing device that is not accessible to the RBI server in the authentication request; and issuing the authentication request to an identity provider that is configured to perform device authentication based at least on the information.

In an embodiment, receiving the authentication artifact from the access service includes receiving an authentication artifact from an access service that is configured to determine an access policy corresponding to the client computing device and generate the authentication artifact based at least on the determined access policy.

In an embodiment, the command includes state information that identifies the RBI service. The browsing context issues the authentication request to the identity provider comprises by including the state information with the authentication request.

In an embodiment, the RBI frontend determines state information that identifies the RBI service. Generating the browsing context configured to issue the authentication request to the identity provider includes configuring the browsing context to include the state information in the authentication request.

In an embodiment, transmitting, by the browsing context, the authentication artifact to the RBI service includes: transmitting the authentication artifact to the RBI service via the RBI frontend; or identifying the RBI service and transmitting the authentication artifact to the identified RBI service.

In an embodiment, a method is performed by a remote browser isolation (RBI) service that is executing on an RBI server. The RBI service includes a remote browser configured to perform web browsing operations for a client browser executing on a client computing device. The method includes determining that the remote browser is configured to issue an authentication request to an identity provider to obtain access to a resource of a resource provider. Responsive to the determining, a command is transmitted to an RBI frontend of the client browser. The command includes an instruction to send a client-side authentication request from the client browser to the identity provider. Responsive to said transmitting the command to the RBI frontend of the client browser, an authentication artifact is received from the client browser. A response to the authentication request that includes the authentication artifact is generated. The response is transmitted to the resource provider.

In an embodiment, determining that the remote browser is configured to issue the authentication request to the identity provider to obtain access to the resource of the resource provider includes determining that the remote browser is configured to issue the authentication request to an identity provider that is configured to perform device authentication based at least on information accessible to the client computing device that is not accessible to the RBI server.

In an embodiment, the command includes state information to be included with the client-side authentication request. The state information identifies the RBI service.

In an embodiment, receiving the authentication artifact from the client browser includes receiving an encrypted authentication artifact from the client browser. Generating the response to the authentication request that includes the authentication artifact includes: decrypting the encrypted authentication artifact to generate a decrypted authentication artifact; and generating a response to the authentication request that includes the decrypted authentication artifact.

In an embodiment, the authentication artifact includes information indicative of an access policy corresponding to the client computing device.

In an embodiment, receiving the authentication artifact from the client browser comprises one of: receiving the authentication artifact from the RBI frontend of the client browser; or receiving the authentication artifact from a tab or window of the client browser that is not the RBI frontend.

VI. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A system, comprising:
a client computing device executing a client browser, the client browser being communicatively connected to a remote browser isolation (RBI) service that is executing on an RBI server and that includes a remote browser configured to perform browsing operations for the client browser, the client browser comprising:
an RBI frontend that is configured to:
receive a command from the RBI service, the command comprising an instruction to issue an authentication request to an identity provider to obtain access to a resource of a resource provider; and
generate a browsing context in response to receiving the command, the browsing context being configured to:
issue the authentication request to the identity provider;
in response to issuing the authentication request to the identity provider, receive an authentication artifact from an access service; and
transmit the authentication artifact to the RBI service.

2. The system of claim 1, wherein the browsing context is one of:
an iframe of the client browser;
a frameset of the client browser;
a tab of the client browser; or
a window of the client browser.

3. The system of claim 1, wherein:
the authentication request includes information accessible to the client computing device that is not accessible to the RBI server; and
the identity provider comprises an identity provider that is configured to perform device authentication based at least on the information.

4. The system of claim 3, wherein the information includes a secure sockets layer (SSL) client certificate.

5. The system of claim 1, wherein the access service comprises an access service that is configured to determine an access policy corresponding to the client computing device and generate the authentication artifact based at least on the determined access policy.

6. The system of claim 1, wherein the browsing context is configured to transmit the authentication artifact to the RBI service by:
transmitting the authentication artifact to the RBI service via the RBI frontend.

7. The system of claim 1, wherein the browsing context is configured to transmit the authentication artifact to the RBI service by:
identifying the RBI service; and
transmitting the authentication artifact to the identified RBI service.

8. A method performed by a client browser that is executing on a client computing device, the client browser being communicatively connected to a remote browser isolation (RBI) service that is executing on an RBI server and that includes a remote browser configured to perform browsing operations for the client browser, the method comprising:
by an RBI frontend of the client browser:
receiving a command from the RBI service, the command comprising an instruction to issue an authentication request to an identity provider to obtain access to a resource of a resource provider; and
generating a browsing context configured to issue the authentication request to the identity provider; and
by the browsing context:
issuing the authentication request to the identity provider;
responsive to issuing the authentication request to the identity provider, receiving an authentication artifact from an access service; and
transmitting the authentication artifact to the RBI service.

9. The method of claim 8, wherein the browsing context is one of:
an iframe of the client browser;
a frameset of the client browser;
a tab of the client browser; or
a window of the client browser.

10. The method of claim 8, wherein said issuing the authentication request to the identity provider comprises:
including information accessible to the client computing device that is not accessible to the RBI server in the authentication request; and
issuing the authentication request to an identity provider that is configured to perform device authentication based at least on the information.

11. The method of claim 8, wherein said receiving the authentication artifact from the access service comprises:
receiving an authentication artifact from an access service that is configured to determine an access policy corresponding to the client computing device and generate the authentication artifact based at least on the determined access policy.

12. The method of claim 8, wherein:
the command includes state information that identifies the RBI service; and
said issuing, by the browsing context, the authentication request to the identity provider comprises:
including the state information with the authentication request.

13. The method of claim 8, further comprising:
determining, by the RBI frontend, state information that identifies the RBI service; and
said generating the browsing context configured to issue the authentication request to the identity provider comprises:
configuring the browsing context to include the state information in the authentication request.

14. The method of claim 8, wherein said transmitting, by the browsing context, the authentication artifact to the RBI service comprises:
transmitting the authentication artifact to the RBI service via the RBI frontend; or
identifying the RBI service and transmitting the authentication artifact to the identified RBI service.

15. A method performed by a remote browser isolation (RBI) service that is executing on an RBI server and that includes a remote browser configured to perform web browsing operations for a client browser executing on a client computing device, the method comprising:
determining that the remote browser is configured to issue an authentication request to an identity provider to obtain access to a resource of a resource provider; and responsive to the determining:
transmitting a command to an RBI frontend of the client browser, the command comprising an instruction to send a client-side authentication request from the client browser to the identity provider;
responsive to said transmitting the command to the RBI frontend of the client browser, receiving an authentication artifact from the client browser;
generating a response to the authentication request that includes the authentication artifact; and
transmitting the response to the resource provider.

16. The method of claim 15, wherein said determining that the remote browser is configured to issue the authentication request to the identity provider to obtain access to the resource of the resource provider comprises:
determining that the remote browser is configured to issue the authentication request to an identity provider that is configured to perform device authentication based at least on information accessible to the client computing device that is not accessible to the RBI server.

17. The method of claim 15, wherein the command includes state information to be included with the client-side authentication request and wherein the state information identifies the RBI service.

18. The method of claim 15, wherein receiving the authentication artifact from the client browser comprises receiving an encrypted authentication artifact from the client browser; and
wherein said generating the response to the authentication request that includes the authentication artifact comprises:
decrypting the encrypted authentication artifact to generate a decrypted authentication artifact; and
generating a response to the authentication request that includes the decrypted authentication artifact.

19. The method of claim 15, wherein the authentication artifact includes information indicative of an access policy corresponding to the client computing device.

20. The method of claim 15, wherein said receiving the authentication artifact from the client browser comprises one of:
receiving the authentication artifact from the RBI frontend of the client browser; or
receiving the authentication artifact from a tab or window of the client browser that is not the RBI frontend.

* * * * *